US008831858B2

(12) United States Patent
Roth et al.

(10) Patent No.: US 8,831,858 B2
(45) Date of Patent: Sep. 9, 2014

(54) METHODS AND SYSTEMS FOR OPERATING AN ENGINE

(75) Inventors: John Stephen Roth, Millcreek Township, PA (US); Kyle Craig Stott, Erie, PA (US); James Robert Mischler, Franklin Township, PA (US); Paul Flynn, Fairview, PA (US); Kirk Heywood, Erie, PA (US); Daniel Allan Moser, Erie, PA (US)

(73) Assignee: General Electric Company, Schenectady, NY (US)

( * ) Notice: Subject to any disclaimer, the term of this patent is extended or adjusted under 35 U.S.C. 154(b) by 552 days.

(21) Appl. No.: 13/149,654

(22) Filed: May 31, 2011

(65) Prior Publication Data

US 2011/0253113 A1 Oct. 20, 2011

Related U.S. Application Data

(63) Continuation-in-part of application No. 12/184,141, filed on Jul. 31, 2008, now Pat. No. 7,953,541.

(51) Int. Cl.

| | |
|---|---|
| ***B60T 7/12*** | (2006.01) |
| ***G05D 1/00*** | (2006.01) |
| ***G06F 7/00*** | (2006.01) |
| ***G06F 17/00*** | (2006.01) |

(52) U.S. Cl.
USPC ...... 701/108; 701/103; 701/104; 123/568.12; 123/676; 60/295

(58) Field of Classification Search
CPC ..... F02D 21/04; F02D 21/08; F02D 41/0035; F02D 41/0025; F02D 41/0235; F02D 41/024; F02D 41/0245; F02D 41/027; F02M 25/0749
USPC ........ 701/103, 104, 108; 123/568.11, 568.12, 123/672, 676; 60/295
See application file for complete search history.

(56) References Cited

U.S. PATENT DOCUMENTS

| | | | | |
|---|---|---|---|---|
| 4,254,752 | A | 3/1981 | Friddell et al. | |
| 5,408,973 | A | 4/1995 | Spangjer | |
| 6,283,072 | B1 | 9/2001 | Lavy et al. | |
| 6,476,722 | B1 | 11/2002 | Bidone et al. | |
| 6,604,515 | B2 | 8/2003 | Marsh et al. | |
| 6,826,903 | B2 * | 12/2004 | Yahata et al. | 60/278 |
| 6,904,879 | B2 | 6/2005 | Kato | |
| 6,904,898 | B1 * | 6/2005 | Sahlen | 123/568.12 |
| 7,131,403 | B1 | 11/2006 | Banga et al. | |
| 7,296,555 | B2 | 11/2007 | Tamma et al. | |
| 7,360,522 | B2 | 4/2008 | Tamma et al. | |
| 7,740,007 | B2 * | 6/2010 | Grandas | 123/568.12 |
| 2007/0125324 | A1 | 6/2007 | Houston | |
| 2008/0060624 | A1 * | 3/2008 | Grandas | 123/568.12 |
| 2009/0056314 | A1 * | 3/2009 | Gabe et al. | 60/278 |
| 2010/0051001 | A1 * | 3/2010 | Webb et al. | 123/568.12 |
| 2011/0072797 | A1 * | 3/2011 | Van Nieuwstadt | 60/285 |
| 2012/0323465 | A1 * | 12/2012 | Peters et al. | 701/104 |

* cited by examiner

*Primary Examiner* — Erick Solis
*Assistant Examiner* — Anthony L Bacon
(74) *Attorney, Agent, or Firm* — GE Global Patent Operation; John A. Kramer

(57) ABSTRACT

Various methods and systems are provided for operating an internal combustion engine, the engine having a plurality of cylinders including one or more donor cylinders and one or more non-donor cylinders. In one example, a method includes, during an exhaust gas recirculation cooler heating mode, operating at least one of the donor cylinders at a cylinder load sufficient to increase an exhaust temperature for regenerating an exhaust gas recirculation cooler, and operating at least one of the non-donor cylinders in a low- or no-fuel mode.

21 Claims, 9 Drawing Sheets

METHODS AND SYSTEMS FOR OPERATING AN ENGINE

CROSS REFERENCE TO RELATED APPLICATIONS

This application is a continuation-in-part of U.S. patent application Ser. No. 12/184,141 filed Jul. 31, 2008, now U.S. Pat. No. 7,953,541, the disclosure of which is incorporated by reference in its entirety for all purposes.

FIELD

Embodiments of the subject matter disclosed herein relate to internal combustion engines and, more particularly, to methods and systems for controlling internal combustion engines.

BACKGROUND

Engines may be configured with exhaust gas recirculation (EGR) systems which recirculate exhaust gas from an engine exhaust system to an engine intake system in order to reduce regulated emissions. In some examples, a group of one or more cylinders may have an exhaust manifold that is exclusively coupled to an intake passage of the engine such that the group of cylinders is dedicated, at least under some conditions, to generating exhaust gas for EGR. Such cylinders may be referred to as "donor cylinders." Further, some EGR systems may include an EGR cooler to reduce a temperature of the recirculated exhaust gas before it enters the intake passage. In such an example, fouling of the EGR cooler may occur when particulate matter (e.g., soot, hydrocarbons, oil, fuel, rust, ash, mineral deposits, and the like) in the exhaust gas accumulate within the EGR cooler, thereby decreasing effectiveness of the EGR cooler and increasing a pressure drop across the EGR cooler as well as temperature of the gas exiting the cooler, resulting in increased emissions and decreased fuel efficiency.

BRIEF DESCRIPTION

In one embodiment, a method for operating an internal combustion engine, the engine having a plurality of cylinders including one or more donor cylinders and one or more non-donor cylinders, is provided. The method includes, during an exhaust gas recirculation cooler heating mode, operating at least one of the donor cylinders at a cylinder load sufficient to increase an exhaust temperature for regenerating an EGR cooler, and operating at least one of the non-donor cylinders in a low- or no-fuel mode.

As an example, a fuel injection quantity to the at least one donor cylinder may be increased to increase the load of the donor cylinder, thereby increasing the exhaust temperature of the donor cylinder. Thus, a temperature of the EGR cooler may be increased due to the higher temperature exhaust gas from the donor cylinder passing through the EGR cooler. In this way, the EGR cooler may be regenerated, as particulate build-up in the EGR cooler may be removed by the high temperature exhaust flow.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and systems for operating an engine with one or more donor cylinders and one or more non-donor cylinders. In one example embodiment, a method for operating an internal combustion engine, includes, in response to an engine load less than a first threshold load for a threshold duration, increasing a fuel injection quantity to one or more of a plurality of cylinders of the engine, the plurality of cylinders including one or more donor cylinders and one or more non-donor cylinders, while decreasing the fuel injection quantity to at least one of remaining cylinders of the plurality of cylinders of the engine. The method further includes, in response to an effectivity of an EGR cooler less than a threshold effectivity during operation in which the engine load is greater than the first threshold load and less than a second threshold load, increasing the fuel injection quantity to at least one of the donor cylinders while decreasing fuel injection to at least one of the non-donor cylinders. In this manner, heating of exhaust ports may be carried out under low load conditions such that accumulated carry-over fuel and oil may be burned off before it reaches the EGR cooler. Further, during operation with a higher engine load (e.g., mid engine load), particulate matter that has built up in the EGR cooler may be burned off by increasing fuel injection to at least one donor cylinder in order to increase the temperature of exhaust which flows through the EGR cooler.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include mining equipment, marine vessels, on-road transportation vehicles, offhighway vehicles (OHV), and rail vehicles. For clarity of illustration, a locomotive is provided as an example mobile platform supporting a system incorporating an embodiment of the invention.

Figure 1:
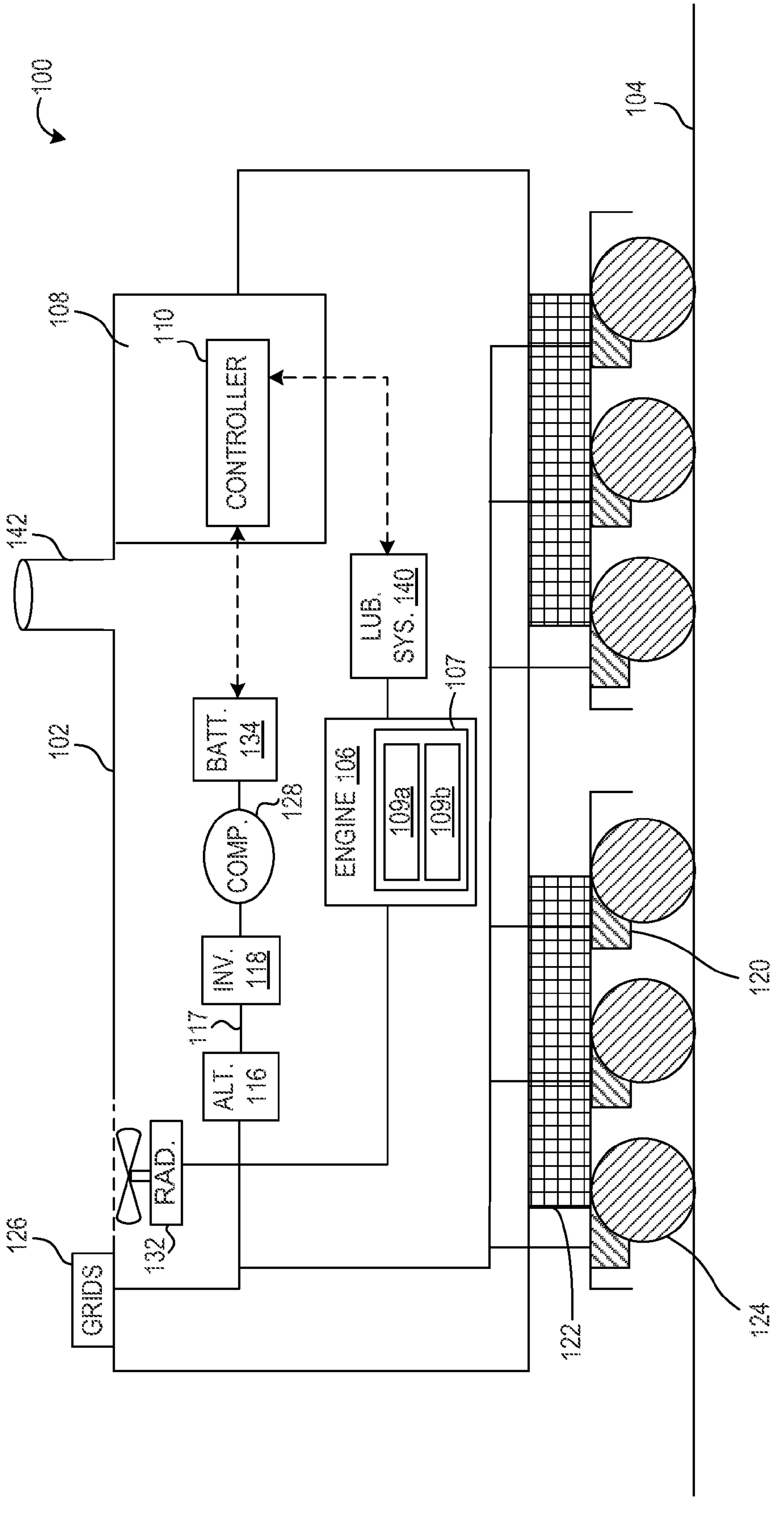
FIG. 1 shows an example embodiment of a diesel-electric locomotive.

Before further discussion of the exhaust heating approach, an example of a platform is disclosed for an engine in a vehicle, such as a rail vehicle. FIG. 1 is a block diagram of an example vehicle system for a rail vehicle, depicted as locomotive 100, configured to run on track 104. As depicted herein, in one example, the locomotive is a diesel electric vehicle operating a diesel engine 106 located within a main engine housing 102. Engine 106 may consume or utilize various fuels and oils, such as diesel fuel and lubricating oil, for example. Engine 106 includes a plurality of cylinders 107. In one example, engine 106 includes twelve cylinders (two banks of six cylinders each). Further, the plurality of cylinders 107 in the engine 106 may include various sets and subsets of cylinders, such as a first subset of cylinders 109*a* and a second subset of cylinders 109*b*. In some embodiments, each subset of cylinders may include one or more donor cylinders and one or more non-donor cylinders. In other embodiments, the first subset of cylinders may include only donor cylinders and the second subset of cylinders may include only non-donor cylinders, for example. The various sets and subsets of cylinders may include one or more cylinder groups for selected operating modes, as described herein. In alternate embodiments, alternate engine configurations may be employed, such as a gasoline engine or a biodiesel or natural gas engine, for example.

Locomotive operating crew and electronic components involved in locomotive systems control and management, for example controller 110, may be housed within a locomotive cab 108. In one example, controller 110 may include a computer control system, as well as an engine control system. The locomotive control system may further comprise computer readable storage media including code for enabling an on-board monitoring and control of locomotive operation. Controller 110, overseeing locomotive systems control and management, may be configured to receive signals from a variety of sources in order to estimate locomotive operating parameters. Controller 110 may be further linked to a display (not shown) to provide a user interface to the locomotive operating crew. In one embodiment, controller 110 may be configured to operate with an automatic engine start/stop (AESS) control system on an idle locomotive 100, thereby enabling the locomotive engine to be automatically started and stopped upon fulfillment of AESS criteria as managed by an AESS control routine.

Engine 106 may be started with an engine starting system. In one example, a generator start may be performed wherein the electrical energy produced by a generator or alternator 116 may be used to start engine 106. Alternatively, the engine starting system may comprise a motor, such as an electric starter motor, or a compressed air motor, for example. It will also be appreciated that the engine may be started using energy from an energy storage device, such as a battery, or other appropriate energy source.

The diesel engine 106 generates a torque that is transmitted to an alternator 116 along a drive shaft (not shown). The generated torque is used by alternator 116 to generate electricity for subsequent propagation of the vehicle. The electrical power generated in this manner may be referred to as the prime mover power. The electrical power may be transmitted along an electrical bus 117 to a variety of downstream electrical components. Based on the nature of the generated electrical output, the electrical bus may be a direct current (DC) bus (as depicted) or an alternating current (AC) bus.

Locomotive engine 106 may be operated under a plurality of load levels, ranging from idle on the low end, to peak engine output on the high end. Low engine load may include operation at a lower end of the engine load range. Mid engine load may include operation at a mid level engine load range above low load. High engine load may include operation at a higher end of the engine load range, above mid engine load. Further, it should be appreciated that while the engine as a whole may operate at a given engine load, each cylinder may have a variable cylinder load ranging also from low-load to high-load. While engine load and cylinder load may coincide, this is not already required. For example, the engine overall may be operated under low load, however, some cylinders may be operated at substantially no-load (e.g., deactivated), while other cylinders operate at a mid- to high-load, depending on the number of cylinders operating at the different loads. Further, a cylinder fuel injection amount may set a cylinder's load. For example, a cylinder operating without fuel injection may be considered deactivated (in which case it may be referred to as skip fire operation which will be described in greater detail with reference to FIG. 2), while a cylinder operating with low fuel injection may be considered to be operating under low-load.

Alternator 116 may be connected in series to one or more rectifiers (not shown) that convert the alternator's electrical output to DC electrical power prior to transmission along the DC bus 117. Based on the configuration of a downstream electrical component receiving power from the DC bus, one or more inverters 118 may be configured to invert the electrical power from the electrical bus prior to supplying electrical power to the downstream component. In one embodiment of locomotive 100, a single inverter 118 may supply AC electrical power from a DC electrical bus to a plurality of components. In an alternate embodiment, each of a plurality of distinct inverters may supply electrical power to a distinct component. It will be appreciated that in alternative embodiments, the locomotive may include one or more inverters connected to a switch that may be controlled to selectively provide electrical power to different components connected to the switch.

A traction motor 120, mounted on a truck 122 below the main engine housing 102, may receive electrical power from alternator 116 via the DC bus 117 to provide traction power to propel the locomotive. As described herein, traction motor 120 may be an AC motor. Accordingly, an inverter paired with the traction motor may convert the DC input to an appropriate AC input, such as a three-phase AC input, for subsequent use by the traction motor. In alternate embodiments, traction motor 120 may be a DC motor directly employing the output of the alternator 116 after rectification and transmission along the DC bus 117. One example locomotive configuration includes one inverter/traction motor pair per wheel-axle 124. As depicted herein, six pairs of inverter/traction motors are shown for each of six pairs of wheel-axle of the locomotive. In alternate embodiments, locomotive 100 may be configured with four inverter/traction motor pairs, for example. It will be appreciated that in alternative embodiments, a single inverter may be paired with a plurality of traction motors.

Traction motor 120 may also be configured to act as a generator providing dynamic braking to brake locomotive 100. In particular, during dynamic braking, the traction motor may provide torque in a direction that is opposite from the rolling direction thereby generating electricity that is dissipated as heat by a grid of resistors 126 connected to the electrical bus. In one example, the grid includes stacks of resistive elements connected in series directly to the electrical bus. The stacks of resistive elements may be positioned proximate to the ceiling of main engine housing 102 in order to facilitate air cooling and heat dissipation from the grid.

In some embodiments, air brakes (not shown) making use of compressed air may be used by locomotive 100 as part of a vehicle braking system. The compressed air may be generated from intake air by compressor 128.

A multitude of motor driven airflow devices may be operated for temperature control of locomotive components. The airflow devices may include, but are not limited to, blowers, radiators, and fans. A variety of blowers (not shown) may be provided for the forced-air cooling of various electrical components. For example, a traction motor blower to cool traction motor 120 during periods of heavy work, an alternator blower to cool alternator 116 and a grid blower to cool the grid of resistors 126. Each blower may be driven by an AC or DC motor and accordingly may be configured to receive electrical power from DC bus 117 by way of a respective inverter.

Engine temperature is maintained in part by a radiator 132. Water may be circulated around engine 106 to absorb excess heat and contain the temperature within a desired range for efficient engine operation. The heated water may then be passed through radiator 132 wherein air blown through the radiator fan may cool the heated water. The radiator fan may be located in a horizontal configuration proximate to the rear ceiling of locomotive 100 such that upon blade rotation, air may be sucked from below and exhausted. A cooling system comprising a water-based coolant may optionally be used in conjunction with the radiator 132 to provide additional cooling of the engine.

An on-board electrical energy storage device, represented by battery 134 in this example, may also be linked to DC bus 117. A DC-DC converter (not shown) may be configured between DC bus 117 and battery 134 to allow the high voltage of the DC bus (for example in the range of 1000V) to be stepped down appropriately for use by the battery (for example in the range of 12-75V). In the case of a hybrid locomotive, the on-board electrical energy storage device may be in the form of high voltage batteries, such that the placement of an intermediate DC-DC converter may not be necessitated. The battery may be charged by running engine 106. The electrical energy stored in the battery may be used during a stand-by mode of engine operation, or when the engine is shut down, to operate various electronic components such as lights, on-board monitoring systems, microprocessors, processor displays, climate controls, and the like. Battery 134 may also be used to provide an initial charge to start-up engine 106 from a shut-down condition. In alternate embodiments, electrical energy storage device 134 may be a super-capacitor, for example.

Lubrication system 140 includes a pressure fed oil system with a crank driven oil pump for lubricating the engine crankshaft, valves, and pistons. A reservoir of oil may be stored in a sump below the engine. The valves are lubricated with splash oil while the cylinder liners are lubricated by the pressurized oil being fed into the piston, off the crankshaft, for both cooling and lubricating purposes. Carry-over of oil into the combustion chamber is controlled by the piston rings. As such, the piston rings may be shaped to allow enough oil to reach the top piston ring and lubricate it when the cylinder is working at full load. Gas pressure balance in the piston ring grooves further controls carry-over of oil into the combustion chamber. Oil drains out below the oil control ring and as the piston moves up and down the cylinder liner, the oil control ring removes the majority of this oil by scraping. The remaining oil is carried by the remaining piston rings to provide them the needed lubrication. If the oil gets heated during passage around the engine, it may be cooled by passage through radiator 132.

Exhaust stack 142 receives exhaust gas from engine 106 and directs it away therefrom. Ducts or tubing (not shown) may be provided between the crankcase (holding the lubricating oil) and the exhaust stack 142 for ventilating the crankcase, for example, for ventilating blow-by gas from the crankcase.

Lubrication system 140 may be configured to supply sufficient oil for a full load operation. However, at light loads, an excess amount of oil may be supplied, and some of the excess oil may be carried into the cylinder chamber and exhaust port. Oil in the combustion chamber may originate from oil retained in the grooves of the cylinder liner walls. As such, the engine may retain some oil in the grooves to provide lubrication for the pistons and rings. Carry-over oil in the combustion chamber may also be contributed by oil lubricating the valves. Herein, oil moves down the valves to provide lubrication between the valve and the valve guide, and further at the seating surface of the valve on the cylinder head. When the engine has accumulated a few hours of operation, the oil carry-over condition may be more severe and the condition may be exacerbated by the carry-over of excess lubrication oil into an associated turbocharger over a period of time. Thus, controller 110 communicating with the engine system may be configured to enable a port heating routine, as further elaborated in FIGS. 4-5, to allow the unburned oil to be burned off and avert degraded engine performance due to accumulation of unburned oil. It will be appreciated that the routine may also allow unburned fuel, as may have accumulated in the combustion chamber due to poor fuel combustion under low load conditions, to also be burned off.

Figure 2:
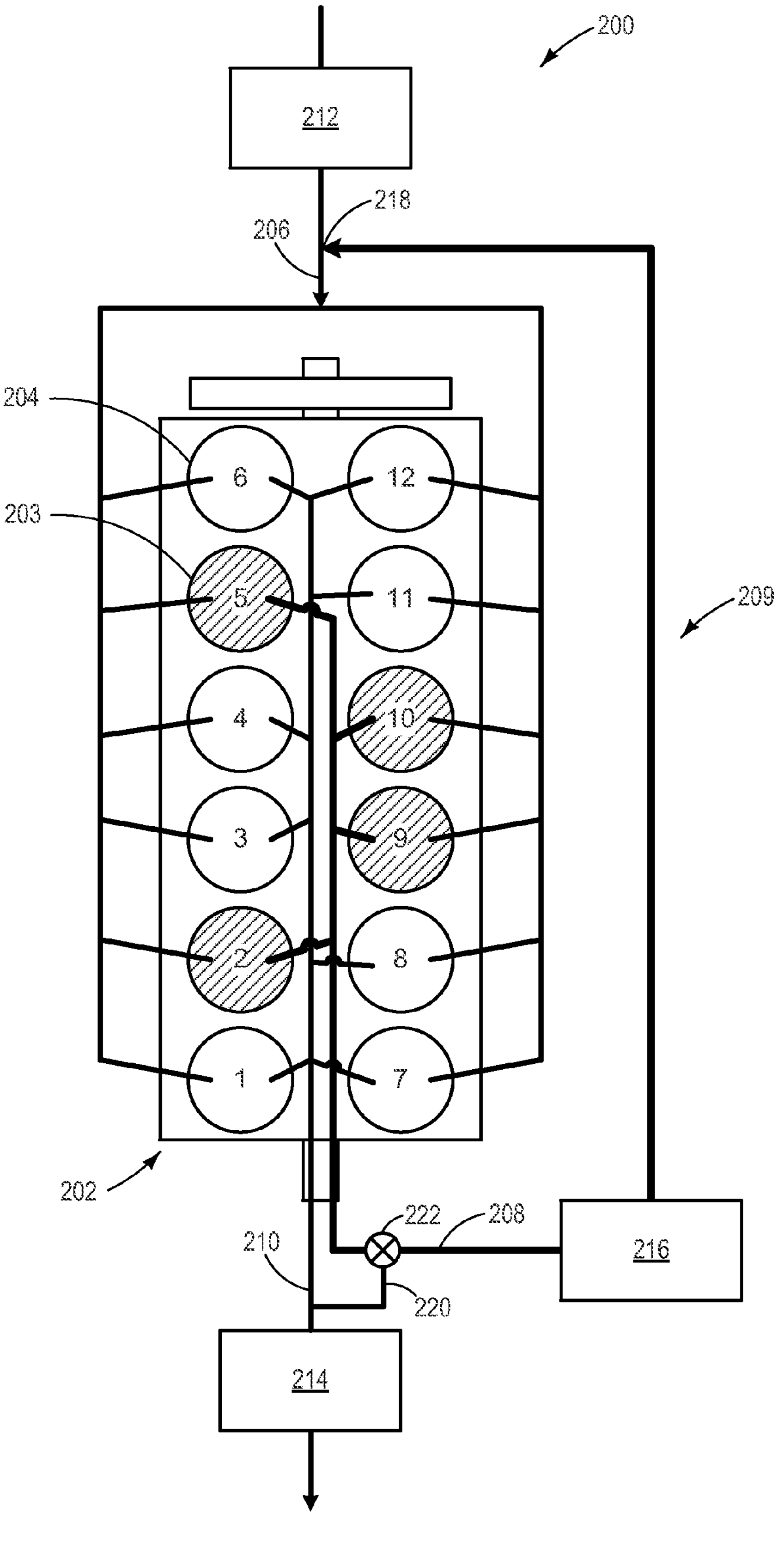
FIG. 2 shows a schematic diagram of an example embodiment of an engine with a plurality of donor cylinders and a plurality of non-donor cylinders according to an embodiment of the invention.

FIG. 2 shows an example embodiment of a system 200 with an engine 202, such as engine 106 described above with reference to FIG. 1, having a plurality of donor cylinders 203 and a plurality of non-donor cylinders 204. In the example embodiment of FIG. 2, the engine 202 is a V-12 engine having twelve cylinders. In other examples, the engine may be a V-6, V-8, V-10, V-16, I-4, I-6, I-8, opposed 4, or another engine type.

In the example embodiment of FIG. 2, the donor cylinders 203 are depicted as a first group of cylinders comprising four cylinders (e.g., cylinders labeled 2, 5, 9, and 10 in FIG. 2). The non-donor cylinders 204 are depicted as a non-donor group of cylinders comprising eight cylinders (e.g., cylinders labeled 1, 3, 4, 6, 7, 8, 11, and 12 in FIG. 2). In other embodiments, the engine may include at least one donor cylinder and at least one non-donor cylinder. For example, the engine may have six donor cylinders and six non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

In some examples, the donor cylinders 203 may form a first subset of cylinders and the non-donor cylinders 204 may form a second subset of cylinders. In other examples, one subset of cylinders may include one donor cylinder and five non-donor cylinders (e.g., cylinders 1, 2, 3, 4, 6, and 7) and another subset of cylinders may include three donor cylinders and three non-donor cylinders (e.g., cylinders 5, 8, 9, 10, 11, and 12). It should be understood, each subset of cylinders may include any suitable number of donor cylinders and/or non-donor cylinders.

As depicted in FIG. 2, the donor cylinders 203 are coupled to a first exhaust manifold 208 which is part of an exhaust gas recirculation (EGR) system 209. The first exhaust manifold 208 is coupled to the exhaust ports of the donor-cylinders. As such, in the present example, the donor cylinders 203 are coupled exclusively to the first exhaust manifold 208.

Exhaust gas from each of the donor cylinders 203 is routed through the EGR system 209 to an exhaust gas inlet 218 in the intake passage 206, and not to atmosphere. Exhaust gas flowing from the donor cylinders to the intake passage 206 passes through an EGR cooler 216 to cool the exhaust gas before the exhaust gas returns to the intake passage. The EGR cooler 216 is in fluid communication with a liquid coolant or other coolant to cool the exhaust gases from the donor cylinders 203. In some embodiments, the liquid coolant may be the same coolant that flows through the radiator 132 depicted in FIG. 1, for example.

In the example embodiment illustrated in FIG. 2, the non-donor cylinders 204 are coupled to a second exhaust manifold 210. The second exhaust manifold 210 is coupled to the exhaust ports of at least the non-donor-cylinders, but, in some examples, may be coupled to exhaust ports of the donor cylinders. For example, exhaust gas from one or more of the donor cylinders may be directed to the second exhaust manifold 210 via a control element, such as a valve, such that an amount of EGR may be reduced as desired, for example. In the present example, the non-donor cylinders 204 are coupled exclusively to the second exhaust manifold 210. Exhaust gas from the non-donor cylinders 204 flows to an exhaust system, and then to atmosphere. The exhaust system may include exhaust gas treatment devices, elements, and components, for example, a diesel oxidation catalyst, a particulate matter trap, hydrocarbon trap, an SCR catalyst, etc., as described above. Further, in the present example, exhaust gas from the non-donor cylinders 204 drives a turbine 214 of a turbocharger.

Some embodiments, such as depicted in FIG. 2, may include a communication passage 220 between the first exhaust manifold 208 and the second exhaust manifold 210. As shown, the communication may include a valve 222 (e.g., an EGR valve), and the controller may operate the valve to control communication the donor cylinders and the non-donor cylinders. In such an example, exhaust gas flow from the donor cylinders may be routed to atmosphere instead of to the intake passage or exhaust gas flow from the non-donor cylinders may be routed to the intake passage.

Further, in some embodiments, one or more throttle valves may be disposed in the first exhaust manifold 208. As an example, a throttle valve may be provided for each donor cylinder. As another example, one throttle valve may be provided downstream of the donor cylinders and upstream of the EGR cooler 216. The one or more throttle valves may be controlled by a controller, such as the controller 110 described above with reference to FIG. 1, such that a backpressure on the engine is controlled. In this manner, the backpressure may be increased on the engine allowing for a higher fueling value without increasing engine output, thereby increasing the exhaust temperature of the donor cylinders for port heating or EGR cooler heating.

In embodiments in which the engine is a V-engine, the exhaust manifolds 208 and 210 may be inboard exhaust manifolds. For example, the exhaust ports of each of the cylinders are lined up on the inside of the V-shape. In other embodiments, the exhaust manifolds 208 and 210 may be outboard exhaust manifolds. For example, the exhaust ports of each of the cylinders are lined up on the outside of the V-shape.

As depicted in FIG. 2, the engine 202 is configured with a turbocharger including the exhaust turbine 214 arranged along the second exhaust manifold 210, and a compressor 212 arranged in the intake passage 206. The compressor 212 may be at least partially powered by the exhaust turbine 214 via a shaft (not shown). As shown in FIG. 2, the exhaust gas inlet 218 is downstream of the compressor 212 in the intake passage 206.

In a V-12 engine, such as depicted in FIG. 2, the engine may have a cylinder firing order such as 1-7-5-11-3-9-6-12-2-8-4-10, for example, in which cylinder 1 fires first, cylinder 7 fires second, cylinder 5 fires third, and so on. In other examples, the cylinders may have a different firing order. During normal, non-skip fire conditions, each cylinder is fired once every engine cycle, or once every 720 crankshaft degrees, according to the cylinder firing order. In the embodiment depicted in FIG. 2, the engine 202 comprises four donor cylinders, and thus in non-skip fire conditions, four out of twelve fired cylinders are donor cylinders. As a result, approximately 33% of the gasses inducted into the cylinders may derive from the donor cylinders.

During non-preferential skip fire conditions, the donor cylinders may be fired in the same proportion as non-skip fire conditions, for example if half of the cylinders are skipped for the example of FIG. 2, then two of the four donor cylinders may be skipped and 4 of the 8 non-donor cylinders may be skipped thus maintaining the same effective EGR rate. During preferential skip fire conditions, the donor cylinders may comprise a different proportion of the fired cylinders. For example, during a preferential skip fire routine wherein the donor cylinders are preferentially fired, the donor cylinders may comprise four out of nine fired cylinders, or four out of six fired cylinders, two out of ten fired cylinders, or in some embodiments, the non-donor cylinders may be the only cylinders fired. Any proportion of donor cylinders fired is within the scope of this disclosure. The proportion of donor cylinders fired may be selected based upon a desired temperature of exhaust gas from the donor cylinders. For example, when a donor cylinder is skip fired, ambient intake air may be exhausted from the cylinder instead of combustion products and the ambient intake air may have a lower temperature than the combusted gases.

In this manner, the engine may be operated to provide port heating such that the exhaust ports may be cleaned or EGR cooler heating such that regeneration of the EGR cooler may occur while maintaining engine output. In a port heating mode, as described below with reference to FIGS. 4-5, the fuel injection quantity may be increased to a distinct subset of one or more cylinders, which may include one or more donor cylinder and/or non-donor cylinders, while one or more of the remaining cylinders may be skipped such that the temperature of the exhaust flow from the subset cylinders increases. In an EGR cooler heating mode, as described below with reference to FIGS. 7-8, a fuel injection quantity to one or more donor cylinders may be increased, while one or more non-donor cylinders may be skipped such that the temperature of the exhaust flow from the donor cylinders increases. The high temperature exhaust flow which passes through the EGR cooler may increase the temperature of the EGR cooler such that the EGR cooler may be regenerated at a high temperature.

In one embodiment, a method for operating an internal combustion engine, the engine having a plurality of cylinders including one or more donor cylinders and one or more non-donor cylinders, includes, during an exhaust gas recirculation cooler heating mode, operating at least one of the donor cylinders at a cylinder load sufficient to increase an exhaust temperature for regenerating an exhaust gas recirculation cooler, and operating at least one of the non-donor cylinders in a low- or no-fuel mode.

In another embodiment, a method operating an internal combustion engine, comprises, in response to an engine load less than a first threshold load for a threshold duration, increasing the fuel injection quantity to one or more of a plurality of cylinders of the engine, the plurality of cylinders including one or more donor cylinders and one or more non-donor cylinders, while decreasing the fuel injection quantity to at least one of remaining cylinders of the plurality of cylinders of the engine. The method further comprises, in response to an effectivity of an exhaust gas recirculation cooler less than a threshold effectivity during operation in which the engine load is greater than the first threshold load and less than a second threshold load, increasing the fuel injection quantity to at least one of the donor cylinders while decreasing fuel injection to at least one of the non-donor cylinders.

Figure 3:
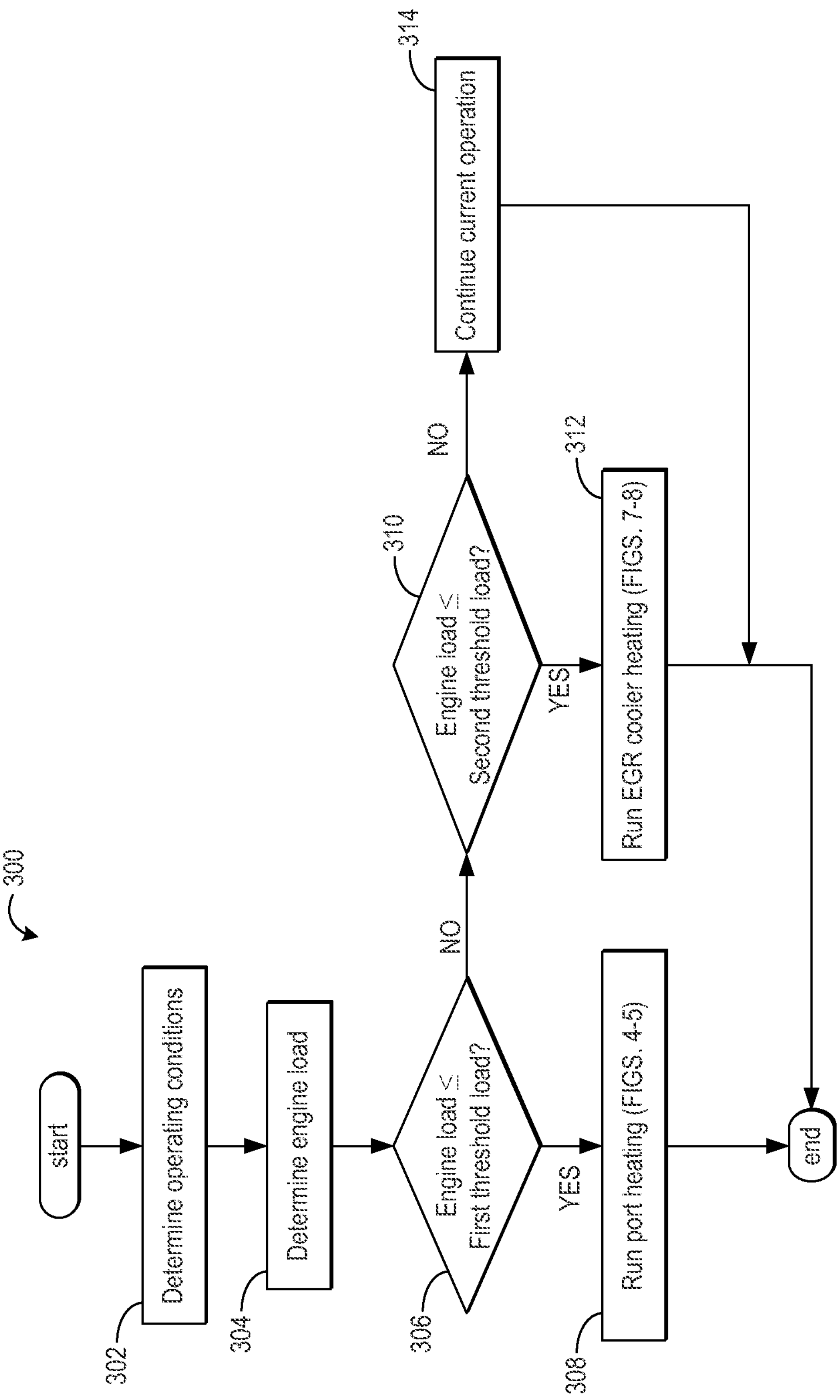
FIG. 3 shows a high level flow chart illustrating a method for an engine according to an embodiment of the invention.
Figure 4:
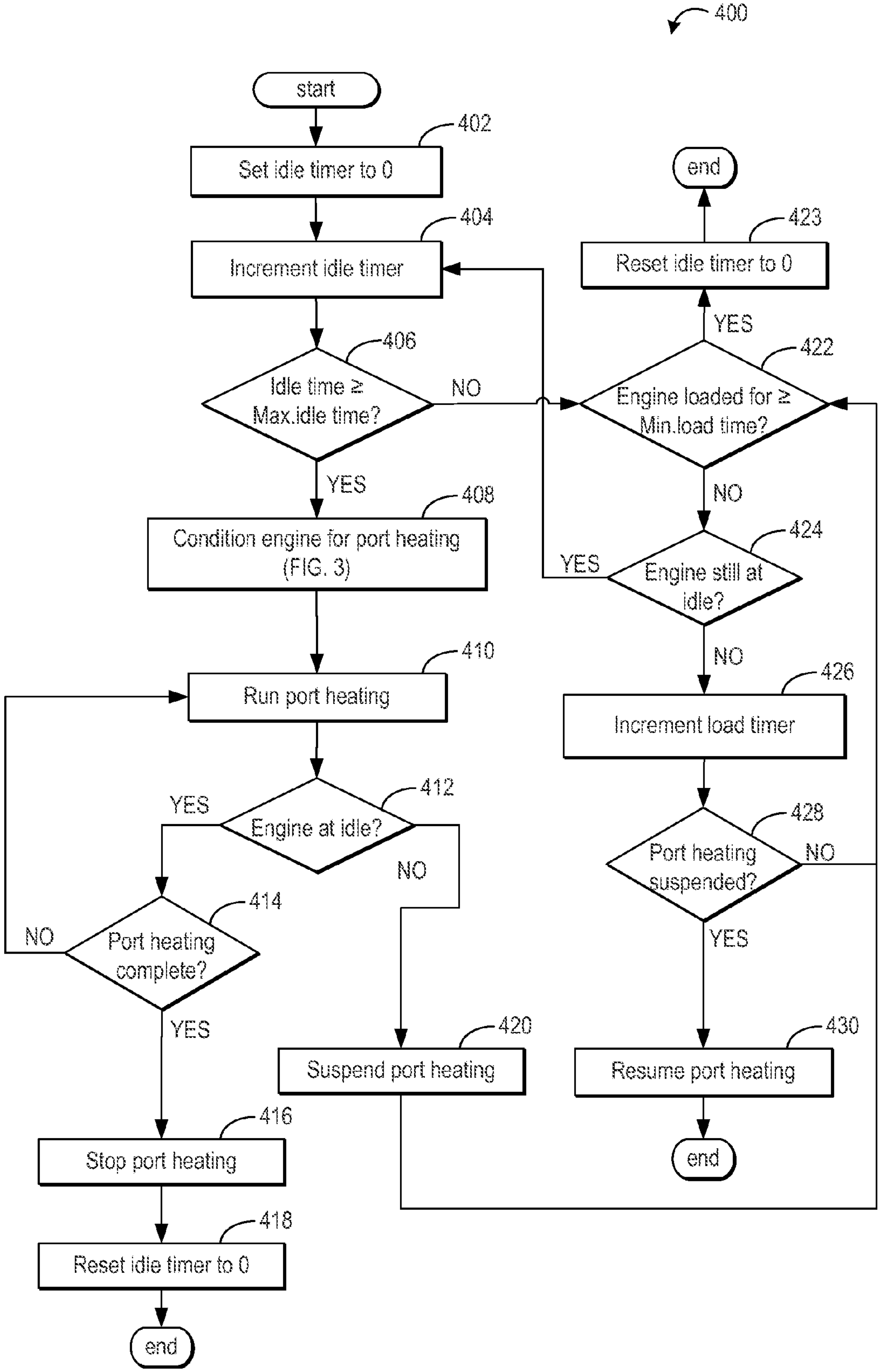
FIG. 4 shows a high level flow chart for a control system configured to enable port heating based on engine load conditions and idling times.
Figure 5:
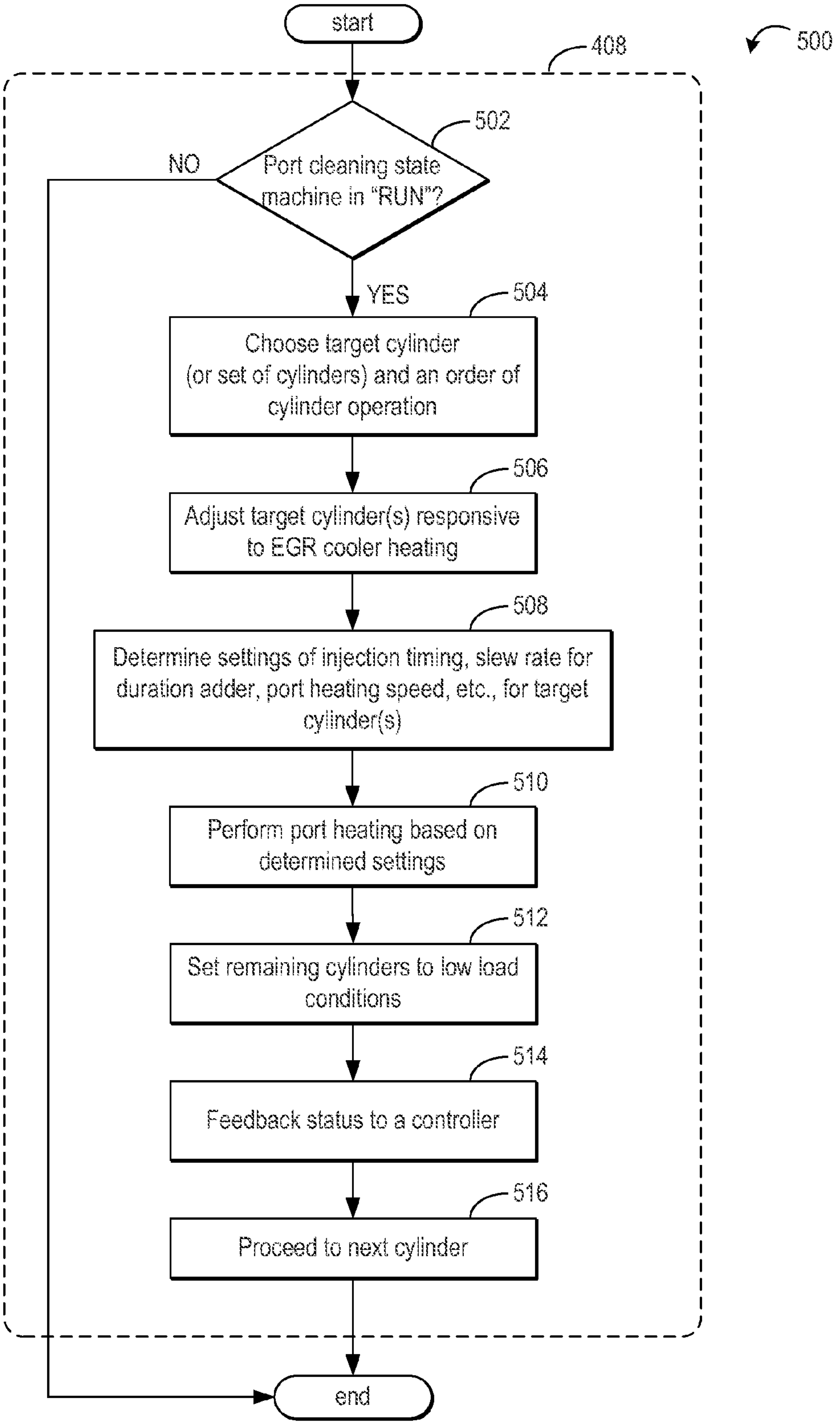
FIG. 5 shows a high level flow chart for a conditioning routine that may be performed to prepare an engine for an ensuing port heating procedure.
Figure 6A:
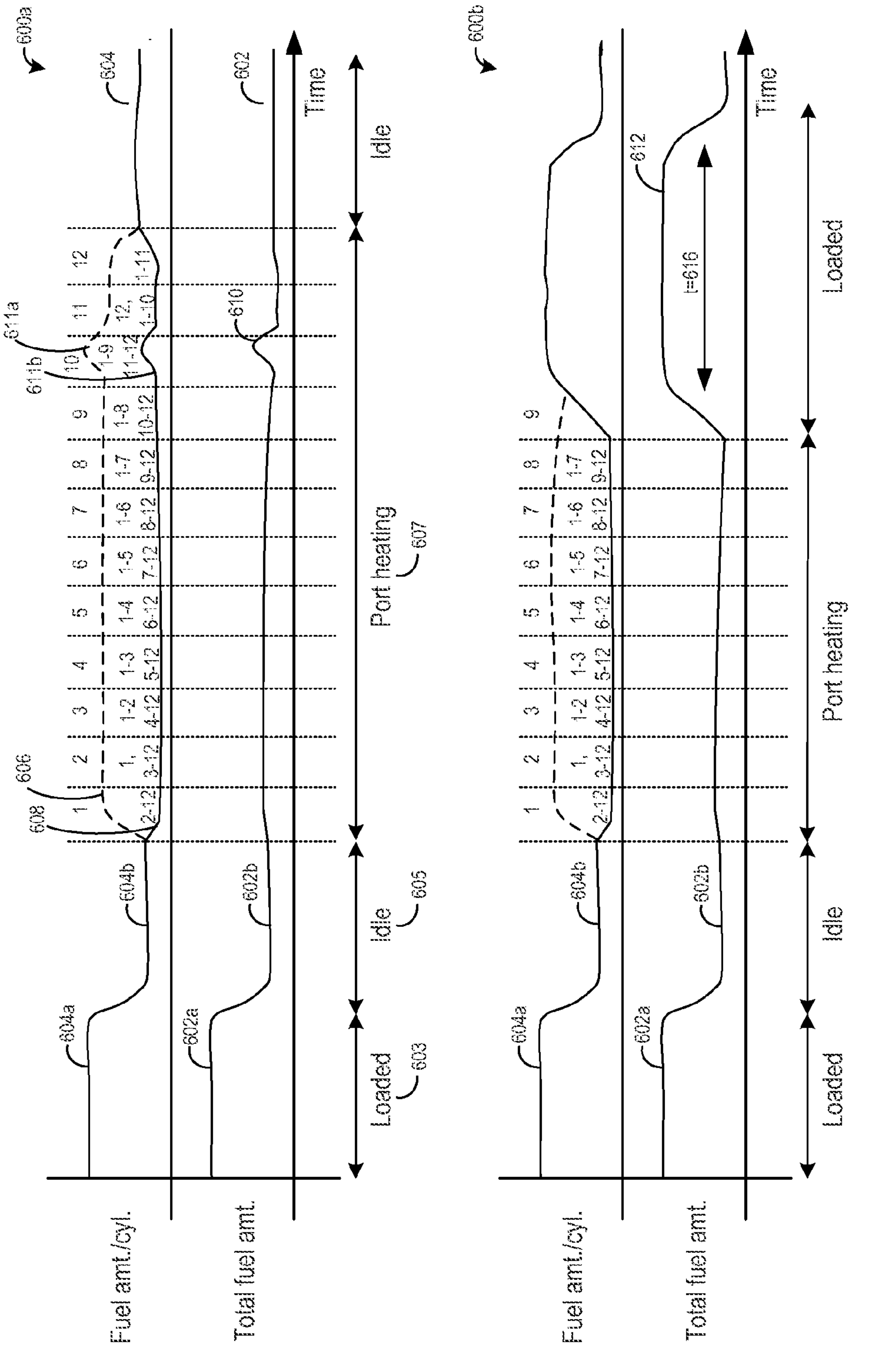
FIGS. 6A-B depict prophetic examples of operation according to FIGS. 4-5.
Figure 6B:
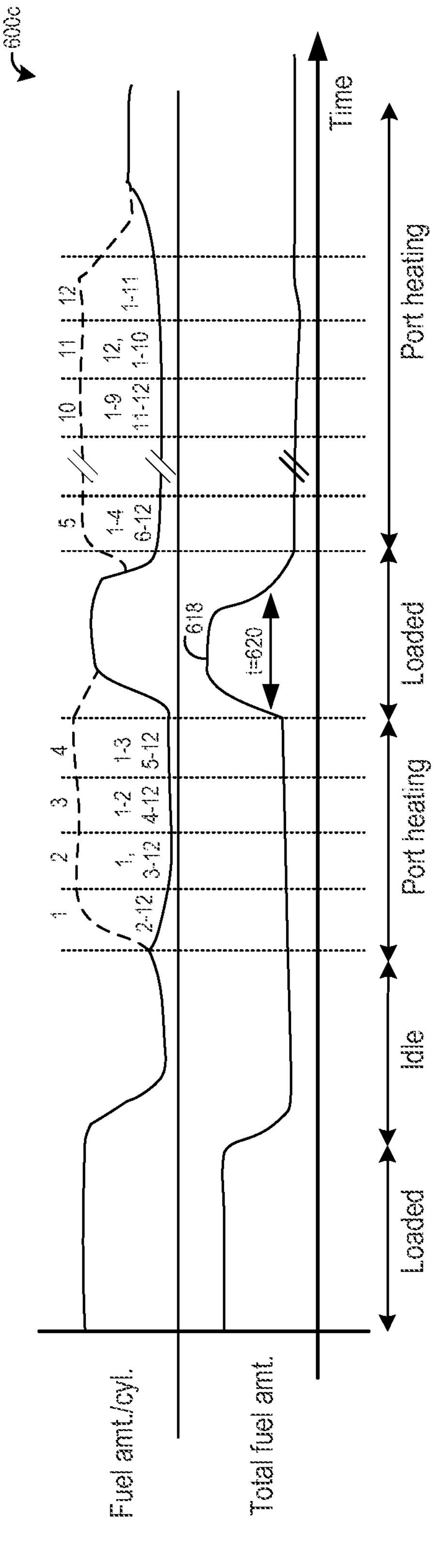
Figure 7:
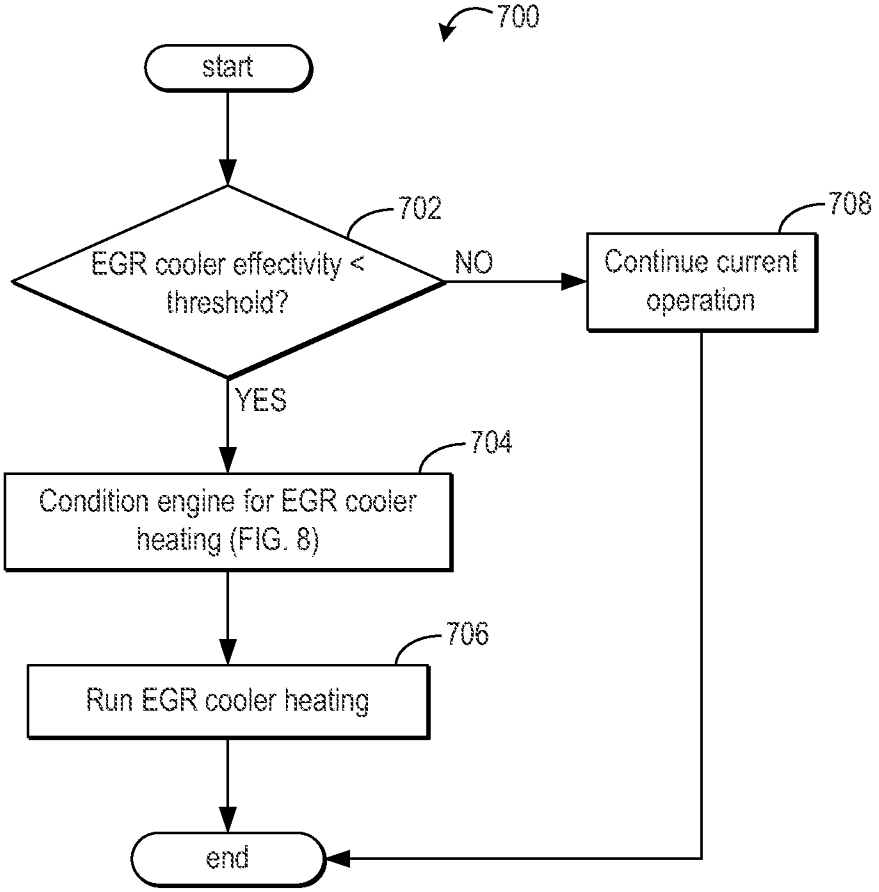
FIG. 7 shows a high level flow chart for a control system configured to enable exhaust gas recirculation cooler heating.
Figure 8:
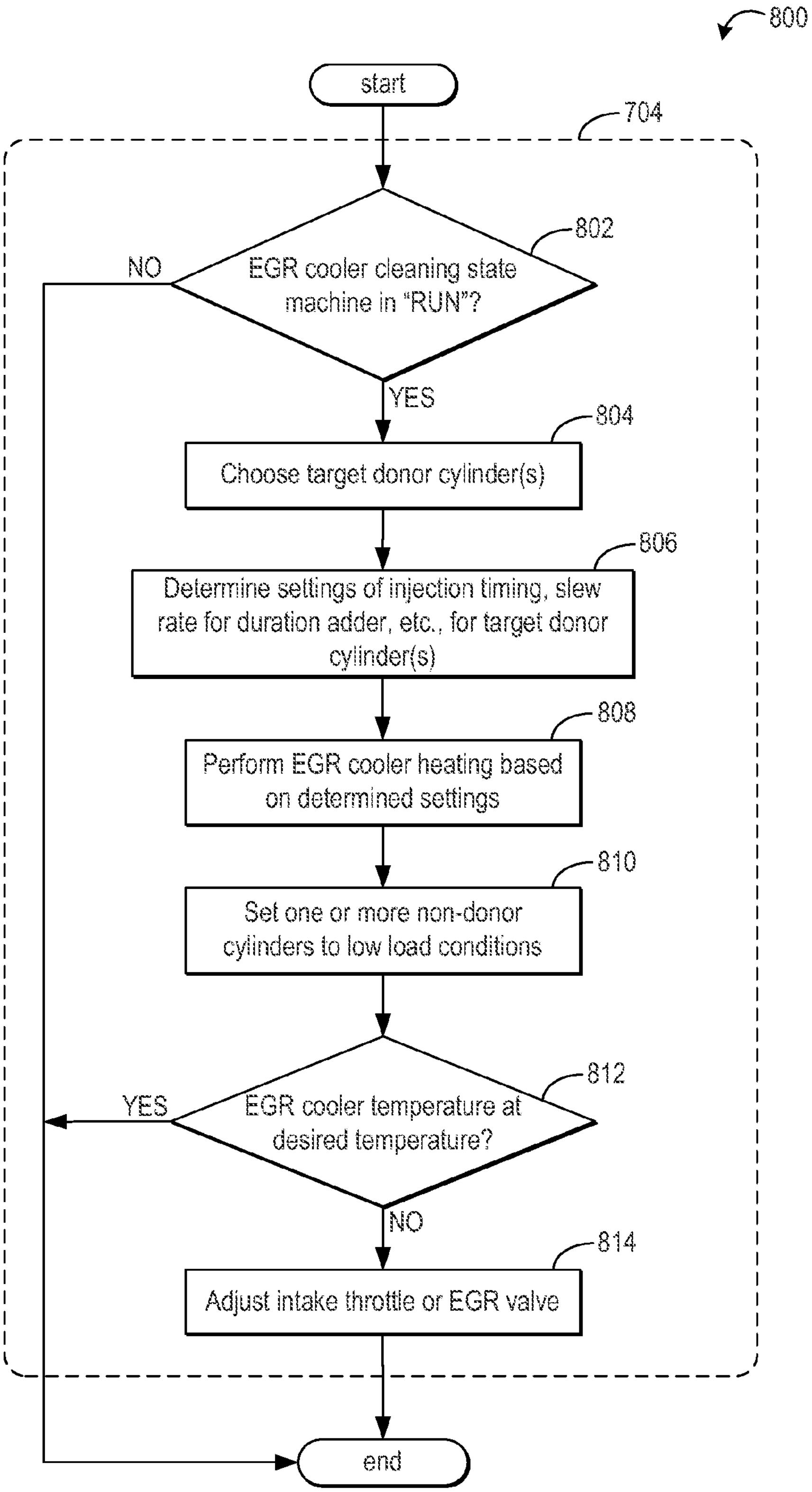
FIG. 8 shows a high level flow chart for a conditioning routine that may be performed to prepare an engine for an ensuing exhaust gas recirculation cooler heating procedure.

Referring now to FIGS. 3-8, method for an engine system, which includes one or more donor cylinders and an EGR cooler, are described. FIG. 3 illustrates a method of determining if a port heating mode or an EGR cooler heating mode of operation may be carried out. FIGS. 4-5 illustrate the port heating mode of operation based on engine load conditions and idling times. FIGS. 6A-6B show examples of engine operation according the method illustrated in FIGS. 4-5. FIGS. 7-8 illustrate the EGR cooler heating mode of operation based on EGR cooler effectivity.

FIG. 3 depicts an example routine 300 that may be performed by a control system, such as by controller 110, in communication with the engine to determine if either of the port heating mode or the exhaust gas recirculation cooler heating mode may be carried. Specifically, the routine determines which routine may be carried out based on the engine load.

At 302, engine operating conditions are determined. The engine operating conditions may include engine idling condition, idling time, engine load, engine loading time, and the like. At 304, the engine load is determined. As described above, the engine load may range from idle on the low end to peak engine output on the high end.

At 306, it is determined if the engine load is less than a first threshold load. In one example, the first threshold load may be a low engine load during idle engine conditions. During operation with engine load below the first threshold load, select cylinders (donor and/or non-donor cylinders) may operate with a higher cylinder load such that exhaust port temperatures are increased so that deposits may be removed. Thus, if the engine load is less than the first threshold load, the port heating mode is run at 308, as described in detail below with reference to FIGS. 4-5.

On the other hand, if the engine load is greater than the first threshold load, the routine moves to 310 where it is determined if the engine load is less than a second threshold load. The second threshold load may be a mid engine load, for example. During operation at the second threshold load, exhaust temperature may be higher than at the first threshold load. Further, at mid engine load, select cylinders (donor and/or non-donor cylinders) may operate with an even higher cylinder load. As such, exhaust temperatures of the select cylinders may be higher than during operation at low engine load such that a temperature of the EGR cooler may be increased so that it may be regenerated. Thus, if the engine load is greater than the first threshold load and less than the second threshold load, the EGR cooler heating mode is run at 312, as described in detail below with reference to FIGS. 7-8. If, instead, the engine load is greater than the second threshold load, current engine operation may be continued at 314.

Thus, the port heating mode and the EGR cooler heating mode may be carried out based on the engine load. During operation with a low engine load, the port heating mode may be run to clean the exhaust ports. During operation with a mid engine load, the EGR cooler heating mode may be run to regenerate the EGR cooler.

FIG. 4 depicts an example routine 400 that may be performed by a control system, such as by controller 110, in communication with the engine to enable exhaust port heating and subsequent burning of unburned oil and/or fuel. The operation may consider engine operating conditions, such as an engine idling condition, idling time, engine load, engine loading time, and accordingly initiate a port heating operation. The port heating operation may be temporarily suspended or cancelled upon changes in engine operating conditions and/or load conditions, and then restarted or resumed at a later time.

In one example, the port heating operation includes successively operating distinct subsets of cylinders at a cylinder load or fuel injection amount sufficient to increase an exhaust temperature of the subset for burning unburned fuel and/or oil deposited in the subset of cylinders and/or exhaust system, while operating the engine in an overall low-load mode or an idle mode. During such operation, each successively operated subset of cylinders may include at least one, but fewer than all, of the plurality of cylinders. And, cylinders that are not currently being operated in the subset are operated in a low- or no-fuel mode. The successive operation may include first operating a subset of cylinders, which may include one or more donor cylinders and/or non-donor cylinders, in the port heating mode, and then operating a different subset of cylinders in the port heating mode, and so on. Further, the distinct subsets may have cylinders in common, but each subset is different from the others in terms of at least one cylinder. In this way, it is possible to remove hydrocarbon deposits from the exhaust of all of the cylinders.

In another example, the port heating may include operating the engine in at least two modes, a first mode with a lower fuel injection amount, and a second mode with a higher fuel injection amount. Specifically, the operation may include operating at least one of the cylinders of the engine in the second mode while at least another cylinder operates in the first mode to increase exhaust temperature at least of the at least one cylinder in the second mode after a designated amount of low-load engine operation, and during the low-load engine operation. Thus, even though the overall engine load is low, select cylinders can operate with a high cylinder load to thereby generate sufficient exhaust port temperatures to remove deposits, at least for that cylinder. Then, by changing which cylinders operate in each mode, different cylinders can have their respective exhaust systems cleaned of deposits. Such operation may continue until all cylinders have been operated with port heating, or until the engine load is increased away from idle or low-load operation (e.g., due to traveling conditions of the locomotive). In such cases, if the engine operates at higher load sufficiently, the port heating may be discontinued (e.g., any cylinders that had not yet been operated in the second mode would have been cleaned by the higher load operation, and thus it may be unnecessary to resume the port heating). However, if the load conditions were not sufficiently high, or for too short of a duration, the port heating may resume where it left off.

It should be appreciated that when operating the engine in a low-load or idle mode with some cylinders (e.g., one or more) operating at lower loads and others (e.g., one or more) at higher loads, various grouping of cylinders may be used. For example, 1 cylinder may operate at a high cylinder load, where the remaining cylinders operate at low-load, such that the overall engine operates under idle or low-load conditions.

Examples of the above operation, along with still further variations and additional operations are now described referring specifically to FIG. 4. At 402, an idle timer is started and an initial setting of time zero is indicated. The idle timer may measure an amount of time spent by the engine in idling conditions. In one example, the idling conditions may include the locomotive parked on a siding for a long term with the engine running at an idling speed. At 404, the idle timer is incremented based on the time spent in idle mode. At 406, it is determined whether the time spent in idle mode is greater than a predetermined maximum idle time. In one example, the pre-specified maximum idle time is 6 hours. If yes, then at 408, the engine may be conditioned for port heating. Note that the idle time may be a continuous idle time without interruptions of other operating modes, or may include a plurality of idle conditions which together reach the maximum idle time.

Also, while the depicted example uses fulfillment of idle timer criteria for enabling port heating, in alternate embodiments, other criteria may be used in addition to the idle timer requirements. As one example, an engine idling speed may be determined and if the speed is above a predetermined port heating speed limit, port heating may be disabled. As elaborated further in FIG. 5, the conditioning procedure may include identifying a first target cylinder where port heating may be initiated and the order of cylinders to follow. Further, the procedure may entail determining injection settings, slew rates, and port heating speeds. Once the engine has been appropriately conditioned, a port heating operation may be run at 410. Alternatively, if routine 400 is being restarted after a previously interrupted port heating operation, then at 410, the operation may be resumed.

Following running of (or resumption of) the port heating procedure, at 412, it is determined whether the engine is in idle conditions. If the engine is idling, then at 414, it may be determined whether the port heating procedure has been completed or not. If the port heating procedure has been completed, further port heating may be stopped at 416 and the idle timer may be reset to zero at 418. However, if at 412 it is determined that the engine is not idling, that is, it is determined that the engine is operating at a higher load condition, port heating may be suspended at 420. The routine may then continue at 422 to determine if the engine load conditions meet a load timer criteria, as further elaborated below. As such, unburned oil and/or fuel accumulation may occur during prolonged engine idling conditions. However, during engine operation at non-idling conditions, the engine exhaust manifold can incur temperature rises that can spontaneously burn off the accumulated unburned oil and/or fuel. Thus, during engine operation at non-idling conditions, the port heating procedure may not be necessitated, and accordingly may be suspended. In this way, the routine may adjust a port heating operation to occur when the engine is idling and thus when the possibility of unburned oil accumulation is higher. The routine may accordingly suspend the port heating operation when the engine is running at higher loads and thus when the unburned oil may be burned off during the normal course of the engine's operation.

Various operations may trigger suspension of the port heating mode, as noted herein. While operation at high load is one example, various others may also occur. For example, speed restrictions may cause the routine to suspend the port heating operation. The speed restriction may include the setting of a minimum engine speed above which the engine speed is maintained, and as such the port heating mode may be suspended. The speed restriction may be requested due to cold ambient temperatures, an operator throttle request, engagement of an auxiliary load, etc.

Returning to 406, if the amount of time spent in idle conditions is not greater than the maximum idle time, then at 422, it is determined if the engine has been loaded for a minimum load time. Also, upon suspension of port heating operations of a loaded engine at 420, the routine may continue to determine whether a minimum load timer duration has been met at 422. If the engine has been loaded for at least the minimum load time, then further port heating may not be needed in anticipation of exhaust temperature rises sufficient to burn off the accumulated unburned oil and/or fuel. Accordingly, at 223, port heating may not ensue and the idle timer may be reset to zero.

However, if neither the maximum idling time is met at 406, nor the minimum load time is met at 422, then at 424, it is determined if the engine is still at idle conditions. If the engine is still idling, the routine may return to 404 to continue incrementing the idle timer, and thereafter proceed with the port heating operation when the idling time criteria has been met. If the engine is not idling at 424, then at 426, the routine may continue incrementing the load timer instead. At 428, it is verified whether a port heating operation had been suspended on a previous iteration of the routine. If so, the routine may resume the port heating operation at 430. If a previous port heating had not been interrupted, then the routine may return to 422 and continue incrementing the load timer until the minimum load time is reached following which the need for the port heating operation may be negated and consequently the idle timer may be reset to zero.

As such, two criteria may be considered in the determination of whether or not to proceed with a port heating procedure. These criteria may be a time spent in an idling mode (as may be defined by an idle timer) and an engine load condition (as may be defined by a load timer and/or a loaded or non-idle condition of the engine). It will be appreciated that the accumulation of unburned oil and/or fuel may be a potential issue during idle or low engine load conditions, and further that during operation of the engine in a sufficiently loaded condition of sufficient duration, the temperature of the exhaust manifold may be raised enough to allow the unburned fuel and oil to be burned during the course of loaded-engine operation.

In one example scenario, the engine is in idling conditions and has spent enough time in idling conditions to warrant a port heating operation to avert adverse effects of accumulated unburned oil. In this situation, where the idle timer criterion is met, a port heating operation may ensue. Upon completion of the operation, the idle timer may be reset to allow a new iteration of the operation to follow. In another example, the engine is not idling, but instead is loaded. Herein, the engine may have spent enough time in the loaded condition to fulfill the load timer criterion and ensure high exhaust manifold temperatures such that a port heating operation may not be required. Herein, as long as the engine is operating in non-idle conditions, and the load timer criterion is met, the idle timer may remain at zero.

In yet another example, the engine has been idling, but not for long enough to fulfill the idle timer criterion. Further, the idling condition of the engine may be interrupted by a sudden operation of the engine in a loaded condition. If the interrupting operation of the engine in the loaded condition continues long enough to fulfill the load timer criterion, then the exhaust manifold temperatures may again be expected to reach desirable high temperatures to allow the unburned oil to be burned off, such that upon returning to idling conditions, a port heating operation may not be required, and as such the idle timer may be reset to zero. However, if the interrupting operation of the engine in the loaded condition is not long enough to fulfill the load timer criterion, then upon completion of the loaded engine operation, the engine may return to an idling condition and resume determination of idle timing.

In still another example, the engine has idled long enough to fulfill the idle timer criterion and has proceeded to run a port heating operation. However, the port heating operation may be interrupted by a sudden operation of the engine in a loaded condition. First of all, the idle condition-interrupting running of the engine will cause the port heating operation to be suspended. Next, if the engine is run long enough to fulfill the load timer criterion, then unburned oil and/or fuel may be purged and thus the port heating operation may be aborted and the idle timer may be returned to zero in anticipation of a new iteration. However, if the engine is run only for a short amount of time (e.g., not enough to fulfill the load timer criterion) and then returned to idle conditions, the port heating operation may be resumed in anticipation of a need to purge the unburned oil and/or fuel. In this way, a control system may be configured to anticipate accumulation and/or burning of unburned oil in an engine exhaust manifold based on the amount of time spent by the engine in idling conditions vis-à-vis running (or loaded) conditions. Accordingly, by judiciously adjusting the operation of a port heating routine, potential issues related to unburned oil buildup may be averted. Further details of a preconditioning procedure, as well as a running and resumption of a port heating operation, will be elaborated in the context of an example routine 500 of FIG. 5 and with prophetic examples in FIGS. 6A-B.

FIG. 5 depicts an example routine 500 that may be performed by a control system to condition an engine for a subsequent running of (or resumption of) a port heating operation. As such, routine 500 may be performed as part of the conditioning step of routine 400, at 408. The routine determines an order of cylinders to be purged of their unburned oil buildup. The routine allows an injection timing, a slew rate and a port heating speed to be adjusted responsive to various parameters, including sudden interruptions during the port heating operation.

At 502, it is determined whether a port heating state machine is in a "RUN" mode (versus a "HOLD" mode). The routine may continue if the run mode has been selected, which in turn requires all the port heating operation criteria to be met. If the state machine is not in the run mode, then the routine may end. At 504, a target cylinder is selected for initiating the port heating operation. Alternatively, a set of cylinders may be selected for initiating the port heating operation. Further, a subsequent order of cylinder purging operation may be determined. As one example, in an engine operating with 12 cylinders, cylinder 1 may be selected to be the target cylinder followed by cylinders 2 through 12, in that order, where cylinders are numbered successively from the front of the engine to the back on one bank, and then from the back to the front on the other bank. In another example, for the same engine, a set of four cylinders (such as cylinders 1-4) may be selected as the target set, followed by the set of cylinders 5-8 and 9-12, in that order. Still another example applies to various engine configurations, such as where the engine is a V-12 engine with two banks of 6 inline cylinders having a log-type exhaust manifold for each bank. Specifically, in this configuration, the order of port heating may include starting with a cylinder located furthest from the exhaust manifold exit (e.g., cylinder 1 where the log manifold exit is located closest to cylinder 6), and successively port heating each of cylinders 1 through 6, thereby performing port heating in the cylinder closest to the exhaust manifold exit (e.g., 6) after the other cylinders in the bank (e.g., 1-5). In this way, the cylinder that may have the greatest accumulation of exhaust hydrocarbons (e.g., cylinder 6) can have the possibility of seeing the longest duration of high temperature exhaust.

The order may also be selected based on a firing order, or based on the manifold configuration, for example from front to back. As such, selection of a target set of cylinders (such as a set of 2 or 4 cylinders) allows even firing to occur and reduces the occurrence of misfiring and potential vibration issues. However, selection of a single cylinder allows a faster response to sudden requests for high load engine operation, as may be required for example during a sudden need to charge a battery, or to compress air for air brakes. Further, the cylinder or cylinder groups may be selected to take advantage of previously heated neighboring cylinders.

At 506, the target cylinders(s) are adjusted responsive to EGR cooler heating. For example, during EGR cooler heating, the fuel injection quantity is increased to at least one of the donor cylinders, resulting in port heating of the exhaust ports of the donor cylinders occurring more often than for non-donor cylinders. Thus, frequency or duration of port heating in donor cylinders may be reduced relative to non-donor cylinders that do not receive port heating during EGR cooler heating. As an example, donor cylinders to which the fuel injection quantity is increased during EGR cooler heating may be selected for port heating operation half as often as non-donor cylinders that do not receive an increased the fuel injection quantity during EGR cooler heating.

At 508, port heating settings for the target cylinder may be determined. These may include settings for an injection timing, a slew rate for a duration adder, a port heating speed and the like. The slew rate may be adjusted to slowly increase the fueling in the targeted cylinder so as to minimize smoke formation. The slew rate may be determined by testing a variety of values and based on which value best meets the emission requirements. As one example, the duration adder angle may be set to 6 degrees of crank angle. That is, the target cylinder may be injected with fuel for 6 additional crankshaft degrees over the remaining cylinders. Further, this may be slewed in over a time period of 60 seconds. This operation would result in a slew rate of 0.1 degrees per minute. Thus, when transferring the cylinder operating mode from a low cylinder load to a high cylinder load, the fuel injection amount may be gradually ramped from a low fuel injection amount to a high fuel injection amount at a slew rate set based on operation conditions (e.g., engine speed, engine temperature, etc.) to thereby reduce potential smoke generation due to the mode transition. Likewise, when transitioning from a high cylinder load mode to a low cylinder load mode, the cylinder fuel injection may be gradually decreased at a slew rate for the additional advantage of reducing impacts on idle speed control and inadvertent idle speed dips and/or engine stalls.

The remaining settings may be based on a target port heating speed (e.g., target idle speed) for the chosen cylinder. The target idle speed may be set to a higher idle speed during port heating (as compared to a lower idle speed during non-port heating conditions) to further increase exhaust temperatures. In one example, the target speed may be compared to an actual (or current) speed. A fuel injection quantity may accordingly be computed to correspond to an amount that may hold the actual speed at the target speed. The duration of the injector current may in turn be adjusted to correspond to the computed fuel injection quantity. A port heating duration may be computed as a sum of the injector current duration and a port heating offset amount. In one example, the port heating duration may be 7 minutes. Once the settings have been established, they may be communicated to the target cylinder and at 510, port heating may be provided in the target cylinder based on the determined settings. At 512, the remaining cylinders (that is the cylinders not part of the target set selected at 504) may be set to low cylinder load conditions. The calculated duration of injector current, as determined at 508 for the target cylinder, may also be communicated with the remaining cylinders at 512. At 514, a status update may be fed back to a controller upon completion of port heating in the target cylinder. At 516, the routine may then proceed to the next target cylinder in the order determined previously at 504.

In this way, the cylinder exhaust ports of an engine may be sequentially and periodically heated to allow unburned oil within to be evaporated and/or combusted, thereby reducing undesirable buildup of fuel in the exhaust ports and exhaust stack. By adjusting the port heating operation responsive to an amount of time spent by the engine in an idling condition, and further based on an engine load condition, exhaust maintenance may be automated and human intervention may be reduced.

Further, the above operation illustrates how idle speed control may be coordinated with the port heating operation. Specifically, in addition to fuel adjustments for selected cylinder subsets, additional idle speed control fuel adjustment to one or all of the cylinders may be used to maintain idle speed and reject disturbances due to various auxiliary loads (such as the brake compressors, battery charging, etc.).

Note that in addition to the above described differential cylinder operation used to increase exhaust temperature, additional operations may further be included to further increase exhaust temperature, including: intake throttling, reduction of EGR, retarding of injection timing, and combinations thereof. For example, when operating some cylinders at higher cylinder load and others at lower cylinder load to port heat the cylinders at higher load, the cylinders at higher cylinder load may utilize retarded injection timing relative to the cylinders at lower cylinder load.

The various possibilities of the port heating routine will be further detailed by example scenarios elaborated herein below and in the prophetic examples of FIGS. 6A-B. Specifically, FIGS. 6A-B further detail the concepts introduced in FIGS. 2-3 through the use of example case scenarios in maps 600*a-c*. It will be appreciated that the numbering introduced in map 600*a* is used herein to represent similar parts in maps 600*b-c*. Map 600*a* graphically represents changes in the total engine fuel consumption 602 (along y-axis) and corresponding changes in individual cylinder fuel consumption 604 (along y-axis) during engine operation (as time, along x-axis), including during a port heating operation. As such, the engine may be in an engine high-load mode 602*a*, such as during a loaded condition 603, or an engine low-load mode 602*b*, such as during an idle condition 605 and a port heating condition 607. The overall engine fuel consumption 602 during the port heating condition 607 may be an engine low-load 602*a*, similar to that during idle conditions 605. In the same way, the cylinders may operate with a cylinder high-load 604*a* during the loaded engine condition or a cylinder low-load 604*b* during the idle engine condition. Further, when the engine is in a port heating condition 607, the cylinders may be differentially operated such that some cylinders are operated in cylinder high-load and some cylinders are operated in cylinder low-load, such that the net fuel consumption of the engine during the port heating condition may remain at an engine low-load.

As shown in map 600*a*, during an initial loaded engine condition 603, the engine may operate at engine high-load 602*a* with a large amount of fuel being consumed. Correspondingly, the cylinders may also operate at cylinder high-load 604*a* during this time. During an ensuing engine idle condition 605, the total fuel consumption of the engine drops as the engine shifts to an engine low-load mode 602*b*. Correspondingly, a reduced amount of fuel is consumed by the cylinders, which may now also operate with a cylinder low-load 604*b*. Once the engine has spent sufficient time 409 in the idle mode, and an idle timer criterion has been fulfilled, the engine may commence the port heating operation.

As previously elaborated in FIG. 5, an engine conditioning step may precede the port heating. Herein a target cylinder may be selected wherein port heating may be initiated, and a subsequent order of cylinder port heating may be determined. In the depicted example, the engine has 12 cylinders and cylinder 1 is the target cylinder where port heating is to be initiated, followed by cylinders 2-12 in that order. Thus, to allow the target cylinder to be purged of accumulated unburned oil and/or fuel without affecting the total amount of fuel consumed by the engine (that is, to stay constant at the engine low-load 602*b*), the cylinders may be differentially fuelled and operated. The target cylinder (Cyl. 1) may be shifted to an adjusted cylinder high-load 606 (dotted line), while the remaining cylinders (Cyl. 2-12) may be shifted to an adjusted cylinder low-load 608 (solid line). This ensures a desired increase in the temperature of only the target cylinder exhaust port to enable evaporation of the oil built up therein. As the exhaust port heating procedure continues, the target cylinder operated at the adjusted cylinder high load 606 may gradually shift from cylinder 1 to cylinder 12 (as depicted by the transitioning cylinder label for dotted line 606) via all the intervening cylinders, based on the predetermined order of port heating operation. In this way, all the cylinder ports may be cleaned by the end of the port heating operation, without having affected the engine's overall fuel consumption. Thus immediately following cylinder 1, cylinder 2 may be operated at adjusted cylinder high-load 606. Similarly, immediately following cylinders 2-12, cylinders 1 and 3-12 may be operated at adjusted cylinder low-load 608. The same may continue until all the 12 cylinders have been sequentially purged of their unburned oil. Thereafter, the engine may be returned to the engine low-load 602*b*, that is an engine idle condition 605, and the cylinders may resume a cylinder low-load 604*b* operation.

During engine idle condition 605, a sudden disturbance may cause a sudden surge in the required engine output, as reflected by a sudden surge 610 in engine load and fuel requirements during the port heating of cylinder 10. As such, during surge 610, the engine temporarily shifts to an engine high-load 602*a*. In one example, a sudden increased engine output may be desired if an on-board energy storage device (such as battery 134) has fallen below a desired state of charge and the engine output is required to return the battery to the desired state of charge. In another example, a sudden increased engine output may be desired if the compressor air pressure has fallen below a desired range, and the compressor needs to be run to return the air pressure to the desired value. Thus, in response to the sudden increase in engine demand, and the shift of the engine to the high-load 602*a*, all the cylinders may incur a corresponding surge 611*a-b* in fuel consumption. When the surge conditions have abated, the cylinders may return to their respective adjusted cylinder high-load 606 or cylinder low-load 608, thereby ensuring that the engine operation has also been returned to an engine low-load 602*b* and idling conditions 605.

Map 600*b* depicts a similar scenario with the cylinders operating differentially at the adjusted cylinder high or low-load (606 or 608) during an engine port cleaning operation. In the depicted example, following the port heating of cylinders 1-8 (that is during the port heating of cylinder 9), the engine may be shifted out of idling conditions and run at engine high-load 602*a*, as shown at 612. The high-load operation of the engine may be of a long duration 616. During this long duration high-load engine operation, port heating of cylinder 9 (and subsequent cylinders) may be suspended, and all the cylinders may also be shifted to a cylinder high-load 604*a*. Consequently, at the end of the loaded operation 612, it may be determined that the long duration 616 was long enough that the exhaust manifold temperature of all the cylinders would have risen high enough and evaporated any residual unburned oil therein. Thus, at the end of the long duration high-load mode of loaded engine operation 612, when the engine and cylinders are returned to a low-load (602*b* and 604*b*), the port heating operation may be reset, instead of resumed.

In contrast, map 600*c* depicts a shorter duration loaded engine operation 618 that interrupts the port cleaning of cylinder 5. Herein, the duration 620 of the operation 618 may not be deemed long enough to enable the exhaust ports to be cleaned during the loaded operation. Thus, at the end of operation 618, when the engine is returned to a low-load and idling condition, the cylinders may resume port heating. Herein, the interrupted port heating of cylinder 5 may be resumed first, and then the predetermined order of cylinder port heating may ensue. It will be appreciated that in alternate embodiments, when an engine shut-down is requested by an automatic engine start-stop control routine, the port heating operation may be stopped, and the differential operation of at least one of the cylinders operating in the different modes (that is, in either the cylinder high-load or low-load) may be changed, or disabled.

FIG. 7 depicts an example routine 700 that may be performed by a control system, such as by controller 110, in communication with the engine to EGR cooler heating and subsequent regeneration of the EGR cooler. The operation may consider operating conditions, such as EGR cooler effectivity, and accordingly initiate an EGR cooler heating mode of operation.

At 702, it is determined if the EGR cooler effectivity is less than a threshold value. For example, the effectivity of the EGR cooler is a ratio of heat transfer which may be calculated using temperature values of three of the following: exhaust gas in, exhaust gas out, coolant in, and coolant out. An EGR cooler that is fouled due to build-up of particulate matter from the exhaust gas (e.g., soot, hydrocarbons, oil, fuel, rust, ash, mineral deposits, and the like) may have a low effectivity, for example, as exhaust gas may not be effectively cooled. If it is determined that the effectivity is greater than a threshold value, current operation is continued at 708 and the routine ends.

On the other hand, if it is determined that the EGR cooler effectivity is less than the threshold value, then at 704, the engine may be conditioned for EGR cooler heating. As elaborated further in FIG. 8, the conditioning procedure may include identifying target donor cylinder(s) where EGR cooler heating may be initiated. Further, the procedure may entail determining injection settings and slew rates. Once the engine has been appropriately conditioned, an EGR cooler heating operation may be run at 706.

FIG. 8 depicts an example routine 800 that may be performed by a control system to condition an engine for a subsequent running of an EGR cooler heating operation. As such, routine 800 may be performed as part of the conditioning step of routine 700, at 704. The routine determines which donor cylinders may be operated at a higher load to heat the EGR cooler such that it may be regenerated. The routine allows an injection timing and a slew rate to be adjusted responsive to various parameters.

At 802, it is determined whether an EGR cooler heating state machine is in a "RUN" mode (versus a "HOLD" mode). The routine may continue if the run mode has been selected, which in turn requires all the EGR cooler heating operation criteria to be met. If the state machine is not in the run mode, then the routine may end.

At 804, a target donor cylinder, or cylinders, is selected for initiating the EGR cooler heating mode of operation. The target donor cylinders may be selected based on the exhaust temperature and the current temperature of the EGR cooler and the desired temperature of the EGR cooler for EGR cooler regeneration. For example, if the difference between the desired EGR cooler temperature and the current EGR cooler temperature is relatively large, the fuel injection quantity may be increased (e.g., air-fuel ratio decreased) in all of the donor cylinders in order to increase the temperature of the donor cylinder exhaust gas, thereby increasing the temperature of the EGR cooler. On the other hand, if the difference between the desired temperature of the EGR cooler and the current temperature is relatively small, it may be determined the fuel injection quantity to only one donor cylinder may be increased.

At 806, EGR cooler heating settings for the target donor cylinder(s) are determined. These may include settings for an injection timing, a slew rate for a duration adder, a port heating speed and the like. The slew rate may be adjusted to slowly increase the fueling quantity in the targeted cylinder so as to minimize smoke formation. As described above, the slew rate may be determined by testing a variety of values and based on which value best meets the emission requirements. As one example, the duration adder angle may be set to 4 degrees of crank angle. That is, the target cylinder may be injected with fuel for 4 additional crankshaft degrees over the remaining cylinders. Further, this may be slewed in over a time period of 80 seconds. This operation would result in a slew rate of 0.05 degrees per minute. Thus, when transferring the cylinder operating mode from a low cylinder load to a high cylinder load, the fuel injection amount may be gradually ramped from a low fuel injection amount to a high fuel injection amount at a slew rate set based on operation conditions (e.g., engine speed, engine temperature, etc.) to thereby reduce potential smoke generation due to the mode transition. Likewise, when transitioning from a high cylinder load mode to a low cylinder load mode, the cylinder fuel injection may be gradually decreased at a slew rate for the additional advantage of reducing impacts on idle speed control and inadvertent idle speed dips and/or engine stalls.

Once the settings have been established, they may be communicated to the target donor cylinder(s) and, at 808, EGR cooler heating may be provided by the target donor cylinder(s) based on the determined settings. At 810, one or more non-donor cylinders may be set to low cylinder load or no cylinder load conditions. In some examples, one or more non-donor cylinders may be skip fired. The number of non-donor cylinders to operate at lower load or no load may be based on the number of donor cylinders to which the fuel injection quantity is increased. For example, if the fuel injection quantity to every donor cylinder is increased, the fuel injection quantity to each non-donor cylinder may be reduced. Alternatively, if the fuel injection quantity to every donor cylinder is increased, one or more non-donor cylinders may be skip fired while the fuel injection quantity is reduced to one or more other non-donor cylinders. If the fuel injection quantity to one donor cylinder is increased, one donor cylinder may be skip fired or the fuel injection quantity may be decreased in one or more non-donor cylinders corresponding to the amount fuel injection is increased in the donor cylinder. The non-donor cylinders may operate with an even or uneven fuel distribution. When operating with an uneven distribution, the cylinders to which the fuel injection quantity is reduced and/or the cylinders which are skip fired may vary between engine cycles.

At 812, it is determined if the EGR cooler temperature is at a desired temperature. For example, the desired temperature may be the temperature at which the EGR cooler may be regenerated. If the EGR cooler temperature is at the desired temperature, the routine ends. On the other hand, if the EGR cooler temperature is less than the desired temperature, the routine continues to 814 where an intake throttle valve or EGR valve is adjusted to further increase the exhaust temperature. For example, the intake throttle valve may be adjusted such that the overall engine airflow is lowered, thereby reducing the system air-fuel ratio leading to a further increase in exhaust gas. In other examples, an EGR valve and/or throttle valves in the EGR system may be adjusted to further increase the exhaust temperature. For example, the EGR valve may be adjusted such that backpressure on the engine is increased. In some examples, both the intake throttle valve and EGR valve may be adjusted. In this manner, an increased amount of fuel may be delivered to the cylinders in order to maintain engine power and the exhaust temperature may be increased.

By increasing the fuel injection quantity to at least one donor cylinder while decreasing the fuel injection quantity to at least one non-donor cylinder, donor cylinder exhaust temperature may be increased while maintaining engine output. In this way, the EGR cooler may be periodically regenerated during engine operation.

Further, operating the engine in the port heating mode may reduce the amount of particulate build-up in the EGR cooler. For example, as described above, during port heating, carry-over oil and fuel may be burned off at the exhaust port before it can reach the EGR cooler. Further, operating the engine in the EGR cooler heating mode may reduce the duration or frequency at which one or more donor cylinders are operated in the port heating mode. For example, as described above, during EGR cooler heating, one or more donor cylinders are operated with a greater fuel injection quantity resulting in a greater exhaust temperature. Thus, there may be less unburned oil and/or fuel accumulated in the exhaust ports of the one or more donor cylinders operated with a greater fuel injection quantity during operation in the EGR cooler heating mode.

Note that in addition to the above described differential cylinder operation used to increase exhaust temperature, additional operations may further be included to further increase exhaust temperature, including: intake throttling, EGR valve throttling, retarding of injection timing in the donor cylinders, and combinations thereof. For example, when operating some donor cylinders at higher cylinder load and some non-donor cylinders at lower cylinder load to port heat the cylinders at higher load, the donor cylinders at higher cylinder load may utilize retarded injection timing relative to the non-donor cylinders at lower cylinder load. As another example, exhaust temperature may be further increased by selectively throttling EGR gasses to increase backpressure on the engine, resulting in a higher fueling value without increasing engine output.

As used herein, an element or step recited in the singular and proceeded with the word “a” or “an” should be understood as not excluding plural of said elements or steps, unless such exclusion is explicitly stated. Furthermore, references to “one embodiment” of the present invention are not intended to be interpreted as excluding the existence of additional embodiments that also incorporate the recited features. Moreover, unless explicitly stated to the contrary, embodiments “comprising,” “including,” or “having” an element or a plurality of elements having a particular property may include additional such elements not having that property. The terms “including” and “in which” are used as the plain-language equivalents of the respective terms “comprising” and “wherein.” Moreover, the terms “first,” “second,” and “third,” etc. are used merely as labels, and are not intended to impose numerical requirements or a particular positional order on their objects.

Note that the example control and estimation routines included herein can be used with various engine, ship, and/or locomotive system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for operating an internal combustion engine, the engine having a plurality of cylinders including one or more donor cylinders and one or more non-donor cylinders, comprising:

during an exhaust gas recirculation cooler heating mode:

operating at least one of the donor cylinders at a cylinder load sufficient to increase an exhaust temperature for regenerating an exhaust gas recirculation cooler; and operating at least one of the non-donor cylinders in a low- or no-fuel mode.

2. The method of claim 1, further comprising increasing a fuel quantity to the at least one donor cylinder to operate the at least one donor cylinder at the cylinder load sufficient to increase the exhaust temperature.

3. The method of claim 2, wherein fuel injection to all of the donor cylinders is increased.

4. The method of claim 1, further comprising decreasing a fuel quantity to the at least one non-donor cylinder to operate the at least one non-donor cylinder in the low- or no-fuel mode.

5. The method of claim 1, wherein operating the at least one non-donor cylinder in a no-fuel mode includes skip firing the at least one non-donor cylinder.

6. The method of claim 1, wherein the exhaust gas recirculation cooler heating mode is carried out in response to an exhaust gas recirculation cooler effectivity less than a threshold value while an engine load is greater than a first threshold load and less than a second threshold load.

7. The method of claim 1, further comprising, during a port heating mode successively operating distinct subsets of cylinders, the distinct subsets of cylinders including at least one but fewer than all of the plurality of cylinders, at a cylinder load sufficient to increase the exhaust temperature for burning unburned fuel and/or oil deposited in the cylinders or engine exhaust system, wherein cylinders that are not currently being operated in a subset are operated in a low- or no-fuel mode.

8. The method of claim 7, wherein the port heating mode is carried out in response to engine operation with an engine load below a first threshold load for a threshold duration.

9. The method of claim 7, further comprising, during the port heating mode or the exhaust gas recirculation cooler heating mode, further increasing the exhaust temperature by adjusting an intake throttle valve disposed in an intake passage of the engine.

10. The method of claim 7, further comprising adjusting frequency or duration of port heating in the donor cylinders responsive to exhaust gas recirculation cooler heating of the donor cylinders.

11. The method of claim 1, further comprising, during the exhaust gas recirculation cooler heating mode, further increasing the exhaust temperature by adjusting an exhaust gas recirculation valve disposed upstream of the exhaust gas recirculation cooler in an exhaust gas recirculation system.

12. A method for operating an internal combustion engine, comprising:

in response to an engine load less than a first threshold load for a threshold duration, increasing the fuel injection quantity to one or more of a plurality of cylinders of the engine, the plurality of cylinders including one or more donor cylinders and one or more non-donor cylinders, while decreasing the fuel injection quantity to at least one of remaining cylinders of the plurality of cylinders of the engine; and in response to an effectivity of an exhaust gas recirculation cooler less than a threshold effectivity during operation in which the engine load is greater than the first threshold load and less than a second threshold load, increasing the fuel injection quantity to at least one of the donor cylinders while decreasing fuel injection to at least one of the non-donor cylinders.

13. The method of claim 12, wherein operating the engine in response to the engine load less than the first threshold load for a threshold duration includes operating the engine in a port heading mode.

14. The method of claim 12, wherein operating the engine in response to the effectivity of the exhaust gas recirculation cooler less than a threshold effectivity during operation in which the engine load is greater than the first threshold load and less than the second threshold load includes operating the engine in an exhaust gas recirculation cooler heating mode.

15. The method of claim 14, further comprising skip firing at least one of the non-donor cylinders during the exhaust gas recirculation cooler heating mode.

16. The method of claim 14, further comprising, during the exhaust gas recirculation cooler heating mode, adjusting an exhaust gas recirculation valve disposed in an exhaust gas recirculation passage upstream of the exhaust gas recirculation cooler to increase a backpressure on the engine.

17. The method of claim 12, further comprising retarding injection timing of fuel in cylinders in which a fuel injection quantity is increased relative to injection timing of fuel in which injection timing is not increased.

18. The method of claim 12, further comprising adjusting an intake throttle valve disposed in an intake passage of the engine to decrease an air-fuel ratio in the cylinders.

19. A system for a vehicle, comprising:

an internal combustion engine having a plurality of cylinders, the plurality of cylinders including one or more non-donor cylinder and one or more donor cylinder;

an exhaust gas recirculation system including a first exhaust manifold coupled between the donor cylinders and an engine intake passage, and an exhaust gas recirculation cooler;

a second exhaust manifold coupled to the at one or more non-donor cylinders; and a controller configured to identify an engine load, and, when the engine load is less than a first threshold load for a threshold duration, initiating a port heating mode by increasing a fuel injection quantity to at least one of the plurality of cylinders while decreasing the fuel injection quantity to at least one of the plurality of cylinders, and the controller further configured to identify an effectivity of the exhaust gas recirculation cooler, and, when the effectivity is less than a threshold effectivity while the engine load is greater than the first threshold load and less than a second threshold load, initiating an exhaust gas recirculation cooler heating mode by increasing the fuel injection quantity to at least one of the donor cylinders while decreasing the fuel injection quantity to at least one of the non-donor cylinders.

20. The system of claim 19, further comprising an exhaust gas recirculation valve disposed upstream of the exhaust gas recirculation cooler in the first exhaust manifold, and the controller further configured to adjust the exhaust gas recirculation valve during the exhaust gas recirculation cooler heating mode.

21. The system of claim 19, wherein the vehicle is a rail vehicle.

* * * * *

UNITED STATES PATENT AND TRADEMARK OFFICE

CERTIFICATE OF CORRECTION

PATENT NO. : 8,831,858 B2
APPLICATION NO. : 13/149654
DATED : September 9, 2014
INVENTOR(S) : Roth et al.

It is certified that error appears in the above-identified patent and that said Letters Patent is hereby corrected as shown below:

In the Claims

In Column 22, Line 27, in Claim 19, delete "at one" and insert -- at least one --, therefor.

Signed and Sealed this
Twenty-sixth Day of May, 2015

Michelle K. Lee

Michelle K. Lee
*Director of the United States Patent and Trademark Office*